(12) United States Patent
Chen (10) Patent No.: US 6,744,740 B2
(45) Date of Patent: *Jun. 1, 2004

(54) NETWORK PROTOCOL FOR WIRELESS DEVICES UTILIZING LOCATION INFORMATION

(75) Inventor: Priscilla Chen, Sunrise, FL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 17 days.

(21) Appl. No.: 10/036,553

(22) Filed: Dec. 21, 2001

(65) Prior Publication Data

US 2003/0117966 A1 Jun. 26, 2003

(51) Int. Cl.[7] .............................................. H04L 12/28
(52) U.S. Cl. ..................... 370/255; 370/328; 370/386; 455/440
(58) Field of Search ................................ 370/229, 230, 370/235, 238, 254–256, 310.1–313, 328, 389–393, 432; 455/403, 422, 427–430, 432–440, 445, 456, 457

(56) References Cited

U.S. PATENT DOCUMENTS

| 5,850,592 | A | * | 12/1998 | Ramanathan | ................... | 455/7 |
| 5,983,109 | A | * | 11/1999 | Montoya | ..................... | 455/456 |
| 5,987,011 | A | * | 11/1999 | Toh | ............................. | 370/331 |
| 6,304,556 | B1 | * | 10/2001 | Haas | .......................... | 370/254 |
| 6,349,091 | B1 | * | 2/2002 | Li | ............................... | 370/238 |
| 6,459,894 | B1 | * | 10/2002 | Phillips et al. | .............. | 455/424 |
| 6,493,759 | B1 | * | 12/2002 | Passman et al. | ............ | 455/446 |
| 6,522,888 | B1 | * | 2/2003 | Garceran et al. | ........... | 455/456 |

* cited by examiner

Primary Examiner—John Pezzlo
Assistant Examiner—David Odland (57) ABSTRACT

A system and method for establishing a network within a plurality of interconnected and randomly geographically located nodes, such as wireless devices. One or more cluster heads are selected within the nodes and selectively communicate with the other cluster heads and nodes. The cluster head can be a wireless device or a specific dedicated device such as a router. Each cluster head determines the geographical location of that cluster head and the data-dependent nodes of the cluster head, and selectively receives and stores location information of the other cluster heads and dependent nodes to create an optimal data-routing network within the plurality of nodes.

64 Claims, 9 Drawing Sheets

"GATEWAY STATUS" MESSAGE FIELDS

| MSG TYPE | SOURCE LOGICAL ID | CLUSTER HEAD ID | # OF ADJACENT CLUSTERS | ADJACENT CLUSTER HEAD ID 1 | ADJACENT CLUSTER HEAD ID 2 | ... |
|---|---|---|---|---|---|---|

FIG. 7

"CH HELLO" MESSAGE FIELDS

| MSG TYPE | SOURCE CLUSTER HEAD ID | SOURCE CH LOCATION | SOURCE CH COVERAGE MAP | DESTINATION LOGICAL ID | DESTINATION LOCATION | NEXT-HOP LOGICAL ID | DESTINATION CLUSTER HEAD ID |
|---|---|---|---|---|---|---|---|

FIG. 8

"ZONE ROUTE TABLE" MESSAGE FIELD

| MSG TYPE | SOURCE LOGICAL ID | SOURCE CH LOCATION | # OF HOPS LEFT | TIME STAMP | SENDING NODE LOGICAL ID | # OF NODES IN TABLE | NODE #1 LOGICAL ID | NODE #1 LOCATION | NODE #2 LOGICAL ID | NODE #2 LOCATION | ... |
|---|---|---|---|---|---|---|---|---|---|---|---|

FIG. 9

"DATA" MESSAGE FIELDS

| MSG TYPE | SOURCE LOGICAL ID | SOURCE LOCATION | DESTINATION LOGICAL ID | DESTINATION LOCATION | SENDING NODE ID | NEXT-HOP LOGICAL ID | LENGTH OF DATA | DATA |
|---|---|---|---|---|---|---|---|---|

"QUERY" PACKET FIELDS

| MSG TYPE | SOURCE LOGICAL ID | SOURCE LOCATION | DESTINATION LOGICAL ID | DESTINATION LOCATION | SENDING NODE LOGICAL ID | NEXT-HOP LOGICAL ID | QUERY ID | LENGTH OF QUERY | QUERY |

"NAK QUERY" PACKET FIELDS

| MSG TYPE | SOURCE LOGICAL ID | SOURCE LOCATION | DESTINATION LOGICAL ID | DESTINATION LOCATION | SENDING NODE LOGICAL ID | NEXT-HOP LOGICAL ID | QUERY ID |

"ACK QUERY" PACKET FIELDS

| MSG TYPE | SOURCE LOGICAL ID | SOURCE LOCATION | DESTINATION LOGICAL ID | DESTINATION LOCATION | SENDING NODE LOGICAL ID | NEXT-HOP LOGICAL ID | QUERY ID | LENGTH OF QUERY ANSWER | QUERY ANSWER |

*FIG. 13*

"PATH DISCOVERY" PACKET FIELDS

| MSG TYPE | SOURCE LOGICAL ID | SOURCE LOCATION | DESTINATION LOGICAL ID | DESTINATION LOCATION | SENDING NODE ID | NEXT-HOP LOGICAL ID | PACKET ID | # OF PAST NODES | PAST NODE ID #1 | PAST NODE ID #2 | ... |

"PACKET UPDATE" PACKET FIELDS

| MSG TYPE | SOURCE LOGICAL ID | SOURCE LOCATION | DESTINATION LOGICAL ID | DESTINATION LOCATION | SENDING NODE ID | NEXT-HOP LOGICAL ID | # OF PAST NODES | PAST NODE ID #1 | PAST NODE ID #2 | ... |

*FIG. 14*

"WRONG LOCATION" PACKET FIELDS

| MSG TYPE | SOURCE NODE ID | SOURCE LOCATION | DESTINATION LOGICAL ID | DESTINATION LOCATION | SENDING NODE ID | NEXT-HOP LOGICAL ID | MISSING NODE ID | MISSING NODE LOCATION | ORIGINAL SOURCE NODE ID | ORIGINAL SOURCE NODE LOCATION |
|---|---|---|---|---|---|---|---|---|---|---|

"LOCATION DISCOVERY" PACKET FIELDS

| MSG TYPE | SOURCE NODE ID | SOURCE LOCATION | SENDING NODE ID | DESTINATION LOGICAL ID | # OF HOPS ALLOWED TO FORWARD |
|---|---|---|---|---|---|

"NEW LOCATION" PACKET FIELDS

| MSG TYPE | SOURCE NODE ID | SOURCE LOCATION | DESTINATION LOGICAL ID | DESTINATION LOCATION | SENDING NODE ID | NEXT-HOP LOGICAL ID | MISSING NODE ID |
|---|---|---|---|---|---|---|---|

*FIG. 15*

"MULTICAST" PACKET FIELDS

| MSG TYPE | SOURCE LOGICAL ID | SOURCE LOCATION | SENDING NODE ID | RECEIVING NODE ID | MESSAGE ID | MULTICASE AREA (X1, X2, Y1, Y2) | LENGTH OF DATA | DATA |
|---|---|---|---|---|---|---|---|---|

*FIG. 16*

NETWORK PROTOCOL FOR WIRELESS DEVICES UTILIZING LOCATION INFORMATION

BACKGROUND OF THE INVENTION

1. Field of the Invention

The present invention generally relates to computer and wireless self-organizing networks. More particularly, the invention relates to protocols for forming and operations of a network within a plurality of interconnected wireless devices utilizing the geographic location information of the wireless devices. Even more specifically, the present invention is for self-organizing networks that are comprised of pervasive, simple, and low power wireless devices.

2. Description of the Related Art

In computers, a network allows the transfer of data, typically in discrete segments called "packets" or "frames," within a plurality of computers. Networks are readily scalable, from a small local area network (LAN), such as an Ethernet, to the largest network, the Internet. Furthermore, a network can be created through cabling that physically interconnects the computers, and the data packets are transferred in electrical or optical signals across the cabling. Alternately, a partial or full wireless network can be created through devices communicating through extant wireless media.

The general term "wireless networking" refers to technology that enables two or more computers to communicate using standard network protocols, but without network cabling. Strictly speaking, any technology that does this could be called wireless networking. The most common wireless network is a wireless LAN. Wireless LAN technology has been fuelled by the emergence of cross-vendor industry standards such as IEEE 802.11, and has produced a number of affordable wireless solutions that are growing in popularity with business and schools as well as sophisticated applications where network wiring is impossible, such as in warehousing or point-of-sale handheld equipment.

There are commonly two kinds of wireless networks: ad-hoc or access-point (a "hub"). An ad-hoc, or peer-to-peer wireless network consists of a number of computers each equipped with a wireless networking interface card. Each computer can communicate directly with all of the other wireless enabled computers and share files and peripheral devices in this way, but may not be able to access wired LAN resources unless one of the computers acts as a bridge to the wired LAN using special software. (This is called "bridging").

An access point, or base station or other dedicated device, can be used to construct a wireless network wherein the access point acts like a hub to provide connectivity for the wireless computers. The access point can connect, or bridge, the wireless LAN to a wired LAN, allowing wireless computer access to LAN resources, such as file servers or existing Internet connectivity. There are two common types of access points: dedicated hardware access points (HAP) such as Lucent's WaveLAN, Apple's Airport Base Station or WebGear's AviatorPRO; or software access points which run on a computer equipped with a wireless network interface card as used in an ad-hoc or peer-to-peer wireless network. Routers can be used as a basic software access point, and include features not commonly found in hardware solutions, such as Direct PPPoE support and extensive configuration flexibility.

Wireless networking hardware requires the use of underlying technology that deals with radio frequencies, or light wave manipulation, as well as data transmission. The most widely used standard, IEEE 802.11, defines the salient aspects of radio frequency wireless networking. Because most wireless networking hardware vendors support the 802.11 standard, the networks can interoperate with the common data transmission standard.

Further, a wireless and wired network can intercommunicate with an appropriate bridge therebetween. A bridge can be accomplished either with a hardware access point or a software access point where the data can pass through the access point in between the networks. Hardware access points are available with various types of network interfaces, such as Ethernet or Token-Ring, but typically require extra hardware to be purchased. And a software access point does not limit the type or number of network interfaces and also allows considerable flexibility in providing access to different network types, such as different types of Ethernet, Wireless and Token-Ring networks.

In a wireless network, a wireless computer, such as a cell phone, pager, or personnel digital assistant (PDA), can "roam" from one access point to another, with the software and hardware maintaining a steady network connection, typically by monitoring the signal strength from in-range access points and locking on to the one with the best quality. The maintenance of the connection while the wireless device roams is completely transparent to the user. In such configuration, access points are required to have overlapping wireless areas to achieve geographical area coverage. A problem arises in that the several wireless devices of the network can roam within the network and change the path along which the data packets must travel in order to reach the device.

It is well known how to locate the shortest path for data to travel between nodes in a fixed network. Exemplary algorithms such as the Bellman-Ford and Dijkstra algorithms find the shortest paths from a single source vertex (or node) to all other vertices (or nodes) in a weighted, directed graph, such as in a network topology. The algorithms initialize the distance to the source vertex to 0 and all other vertices to $\infty$. It then does V-1 passes (V is the number of vertices) over all edges relaxing, or updating, the distance to the destination of each edge. Finally, each edge is checked again to detect negative weight cycles in which case it returns false. The time complexity for most shortest path algorithms is $O(n^2)$, which is a significant allocation of computer resources. This problem becomes exacerbated in a wireless network where the devices (nodes) are constantly moving, and thus, the shortest path must be continually updated in order to have an optimal network between the wireless devices.

Accordingly, it would be advantageous to provide a system and method for providing a network protocol whereby a plurality of wireless devices self-organize themselves, and can create an optimal wireless network between the wireless devices without constantly utilizing a shortest path algorithm with the algorithm's associated overhead. Such system and method should utilize the resources of the wireless devices as intelligent nodes within the network to assist in determining the shortest paths of the optimal network. It is thus to such a system and method for creating a network within geographically randomly located wireless devices that the present invention is primarily directed.

DETAILED DESCRIPTION OF THE INVENTION

Figure 1:
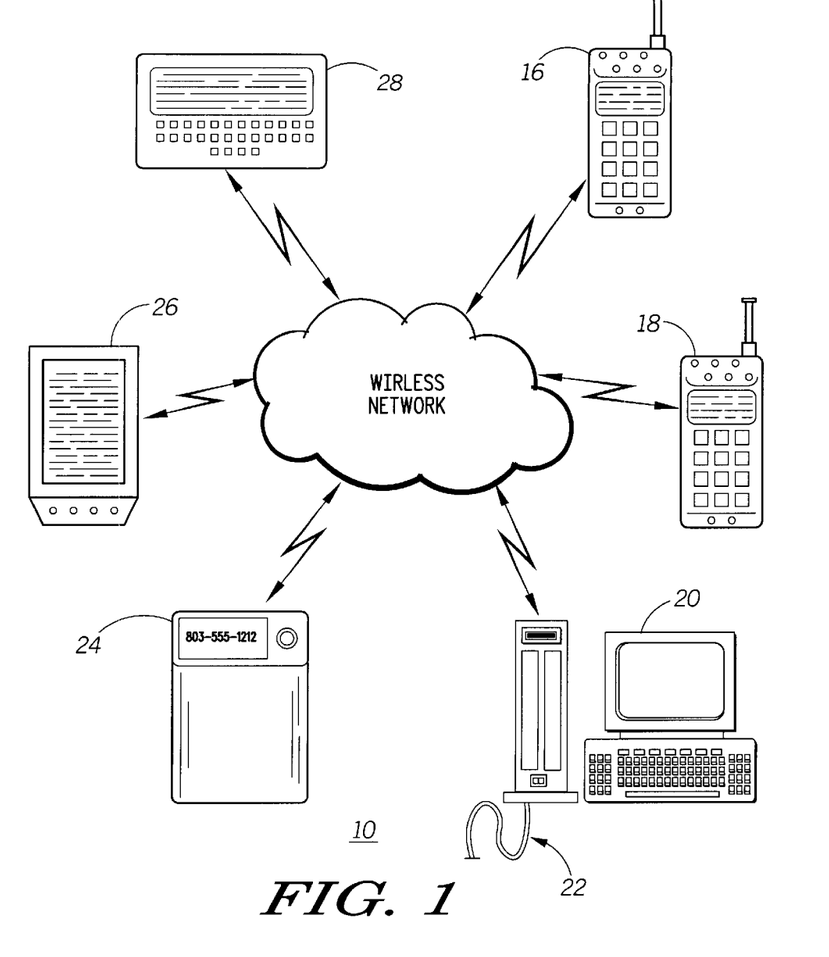
FIG. 1 is a representative diagram of a plurality of wireless devices interconnected through a wireless network.

With reference to FIG. 1, there is shown an inventive system 10 for establishing a network within a plurality of interconnected and randomly geographically located nodes, such as wireless devices on a wireless network 14. Examples of the wireless devices are cellular telephones 16 and 18, a computer 20 having a wireless connection and the computer 20 can also have a wired connection 22 to the other networks. In such configuration, the computer 22 can behave as a dedicated network interface device, such as a router, for data transfer within the wireless network 14, or from the wireless network 14 to other data networks, such as the Internet. The system 10 can include any wireless device as known in the art, with examples including a pager 24, personnel digital assistant (PDA) 26, and an e-mail or text pager 28. Each wireless device 16,18,20,24,26,28 is a node in the wireless network 14. Each of the wireless devices has a computer platform and a temporary memory of the computer platform such that the wireless device can store and compare data, and each of the wireless devices can route information (relay) messages to other nodes in the network.

The system 10 designates one or more cluster heads from the wireless devices (nodes), the cluster head 30 (FIG. 5) selectively communicating with any other cluster heads and nodes within the wireless network 14. As is more fully described herein, each cluster head 30 determines its geographical location, selectively receives and stores location information of the other cluster heads, and calculates and stores the locations of all nodes within its own cluster, in order to create an optimal network using the location information to continually update the shortest data paths within the wireless devices 16,18,20,24,26,28 across the wireless network 14. Any of the wireless devices can be designated at a cluster head, although it is preferred that the cluster head be a dedicated device, such as computer 20, which has greater computational power and storage, has an external power source (AC power), and more easily handle the data traffic of the nodes. The system 10 thus allows the wireless devices to self-organize into a network.

In the wireless network 14, the wireless devices (nodes) are typically interconnected through packet exchange, and each packet is transmitted from an origination node, through one or more nodes of the network, and received at a destination node. The packets are typically comprised of voice, information, or command data. An example of the packet path would is a voice packet from the cellular telephone 16 as an source node, through one or more nodes of the wireless network 14, such as computer 20 as a router, and which is received at cellular telephone 18, the destination node. The terms "message" and "packet" as used herein are interchangeable.

The system 10 thus uses a protocol creating a tree structure network that allows all nodes to obtain a Logical ID, that node's location in relation to a common reference, and a geographical coverage map of that node's decedent nodes. The protocol assumes that: (1) the nodes are randomly located; (2) every node in the network is connected to at least one other node, (3) every node has a unique identifier (ID) on the wireless network 14 which distinguishes that node from other nodes; and (4) all nodes on the wireless network 14 can calculate (or get) their location with respect to some common reference.

The system 10 first selects a few nodes to be cluster heads (CH) or data sinks (DD) among the member nodes. Because most of the data traffic will go through the cluster head 30, and the cluster head 30 will be calculating the relative location for all nodes in its cluster, it is advantageous to choose nodes with high processing power and high-energy sources (such as AC power), such as computer 20. This selection process can be performed automatically through running a random process within each node. This random process can be designed to select the most suitable devices as the cluster heads, i.e. most processing power, best location, most energy available, highest connectivity, and the like.

After the selection, each CH or DD needs to get a logical ID for itself. This can simply be the MAC address of the device, partial bits from the MAC address, some transformation of the MAC address (such as a hash function) into a fixed length random number, or can simply be assigned by a master device. Each cluster head 30 then determines its own location with respect to some reference. Such function can be done by triangulation, global positioning signals (GPS), or manual entry. At least two other nodes in data transmission range of a CH (or DD) also need to find out their location independently and send this information to the CH (or DD). For every remaining node in the wireless network 14, the relative distances between that node and the node's immediate neighbors are determined. Such determination can be done in various ways, including measuring the relative signal strength (RSSI) of signals coming from neighboring nodes, timing from DSSS signals, or using ultra wide band signals. Further, the nodes can use their random IDs to identify other nodes.

Figure 2:
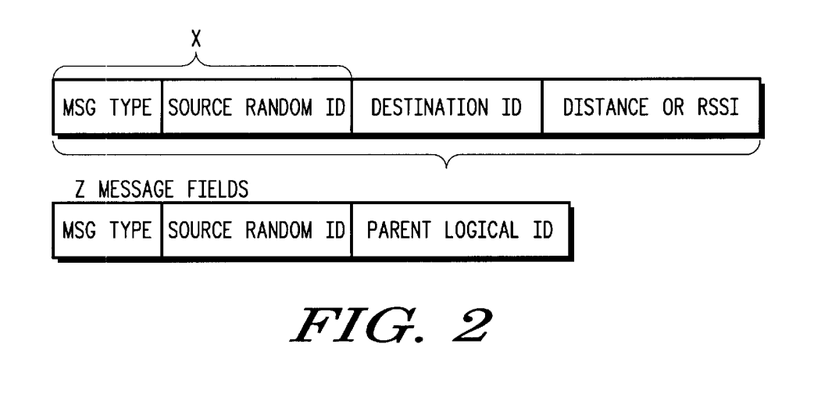
FIG. 2 is a frame diagram of an X, Y and Z message fields.

One example of the location determination in an asynchronous system is accomplished with the packets in FIG. 2. A first node first listens to periodic beacons sent by neighbor nodes and attempts to synchronize with those neighbor nodes the next time the neighbor nodes turn their receivers on. The first node sends an X message to each neighbor node while the receivers are active. Each neighbor node sends a Y message back containing the relative distance between that node and the first node. Each node then collects the relative distance information from all neighboring nodes. The nodes then communicate the distance information to the cluster head 30.

Figure 3:
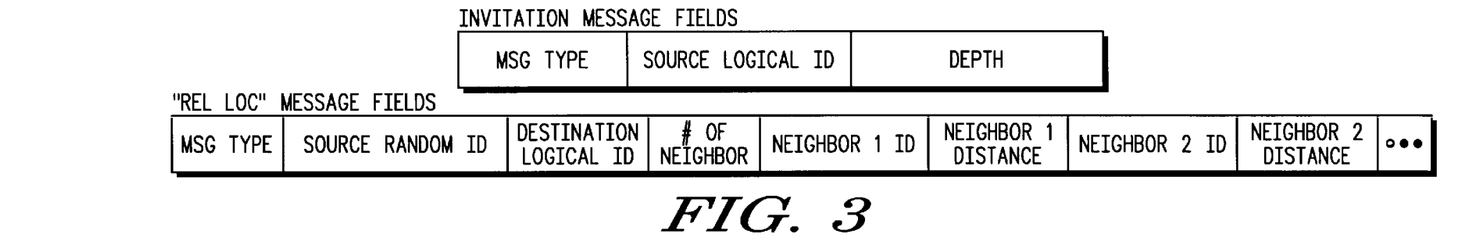
FIG. 3 is a frame diagram of "invitation" message fields and relative location ("Rel Loc") message fields.
Figure 4:
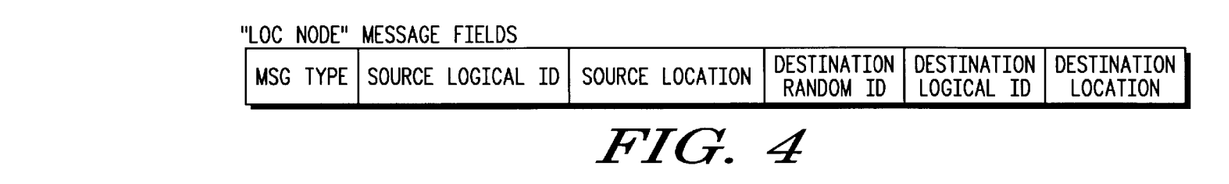
FIG. 4 is a frame diagram of the Location Node ("Loc Node") message fields.

The cluster head(s) 30 first sends out "Invitation" messages (with depth=0), as shown in FIG. 3, informing immediate (1-hop) neighboring nodes of their status. These immediate neighbors ($1^{st}$ layer nodes in FIG. 5) then send in their relative location information ("Rel Loc" message in FIG. 3) to the cluster head 30. Such information is the relative distance between the $1^{st}$ layer nodes and their own immediate neighboring nodes. Again, nodes can use their random IDs to distinguish between each other in this stage. The $1^{st}$ layer nodes also pick the CH or DD as its parent at this time, i.e. that the node will be data-dependent from the cluster head 30. After getting all of the relative distance information from the $1^{st}$ layer nodes, the CH or DD can calculate the position of these nodes with respect to a common reference, and store this information in its database. The CH or DD then sends back "Loc Node" messages, the frame of which is shown in FIG. 4, containing the nodes location information and assigned logical IDs, to the $1^{st}$ layer nodes. The logical ID represents the logical topology of the network and is assigned by the CH or DD. After the $1^{st}$ layer nodes receive their locations from the cluster head, the $1^{st}$ layer nodes in turn send out "invitation" messages (with depth=1)(Frame shown in FIG. 3) to their immediate neighbors ($2^{nd}$ layer nodes). Each $2^{nd}$ layer node then chooses a $1^{st}$ layer node as its parent, and sends a "Z" message to inform the parent of the relationship, a Z message shown in FIG. 2. The parent node then adds the dependent child node to a "Children list." If there are several $1^{st}$ layer nodes in range of a $2^{nd}$ layer node, only one $1^{st}$ layer node will be picked as a parent (by least depth, signal strength, load parameter, or other types of cost metric). Only parent nodes will forward network set-up messages to the CH or DD from their children.

The $2^{nd}$ layer nodes then send in their relative distances messages ("Rel Loc" messages in FIG. 3) to their parent nodes ($1^{st}$ layer nodes). The $1^{st}$ layer nodes can then relay the relative distance messages to the CH or DD. After receiving this message, the CH or DD calculates the $2^{nd}$ layer nodes locations and sends "Loc Node" messages (FIG. 4) back to the $2^{nd}$ layer nodes, along with the assigned logical IDs for each $2^{nd}$ layer node. Each time a node receives a "Rel Loc" message and forwards it to its parent, that node will put a copy of the sender's ID ("Source Random ID" in "Rel Loc" message of FIG. 3) in the nodes' temporary memory. When the CH sends a "Loc Node" message (FIG. 4) back, the intermediate nodes receiving the packet will check their temporary memory. If the "Dest. Random ID" is in the temporary memory of the intermediate node, that node will forward the "Loc Node" message to that node's children and erase the source random ID from temporary memory. Otherwise, the intermediate node will drop the message. If the destination node is a child node, the parent node replaces the child node's random ID with the newly assigned logical ID and forwards the "Loc Node" message to the child.

Figure 5:
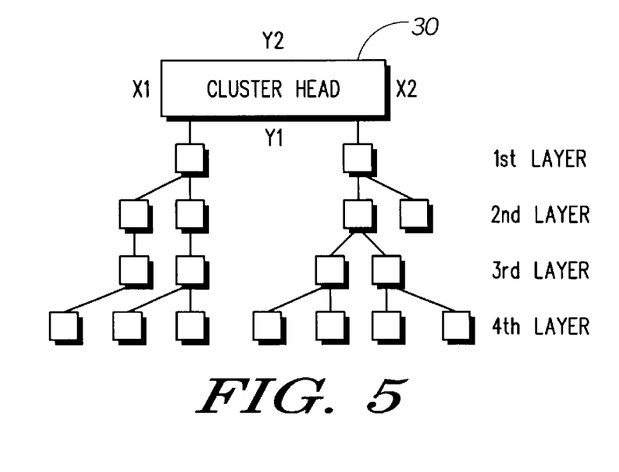
FIG. 5 is block diagram of a coverage map of the layers of dependant nodes in communication with a cluster head.
Figure 6:
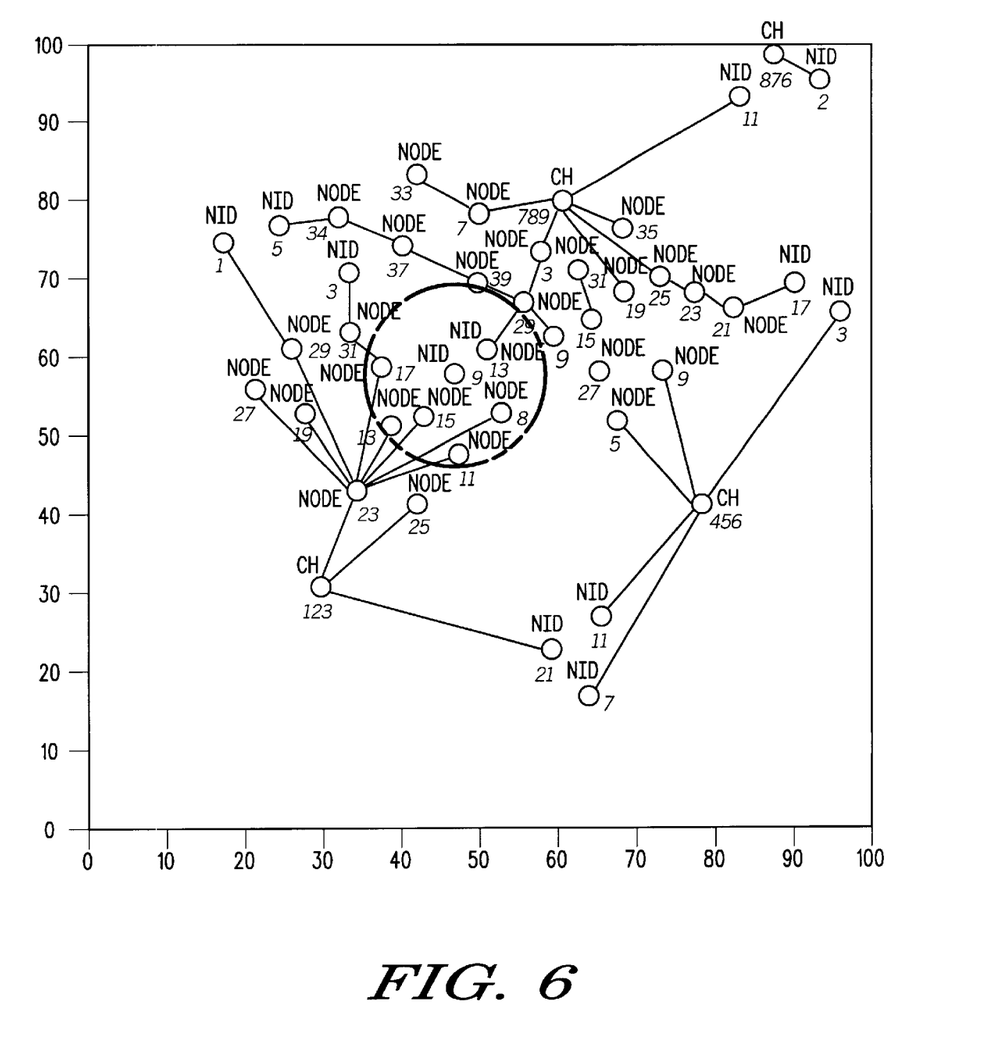
FIG. 6 is a coverage map of the cluster heads, dependent node, and network interface devices created by the inventive system and method.

Each time a parent node forwards a "Loc Node" message to its children, it will update its "Coverage Map." A "Coverage Map" is a square area equal to the union of all the dependent nodes' coverage area. The coverage map can be defined by four points (XI, X2, Y1, Y2) for a 2-D space. FIG. 5 is a block diagram illustrating the "Coverage Map" of a cluster head 30. The sending and receiving of the distances is repeated for each layer of nodes until all of the nodes in the network received their location information, and logical ID from their respective cluster head 30, and the node updates its "Coverage Map". A logical structure of the network, after this set-up stage is illustrated in FIG. 6. FIG. 6 shows an exemplary wireless network 14 after the setup stage (use depth first in choosing parent), with the nodes, cluster heads, and logical IDs (CID,NID) shown in relative geographic proximity to each other. The particular transmission range for node (CID=123,NID=9) is shown as a dashed circle. A logical ID for a node is consisting of a Cluster ID (CID) and a Node ID (NID), each node is identified as (CID,NID).

Figure 7:
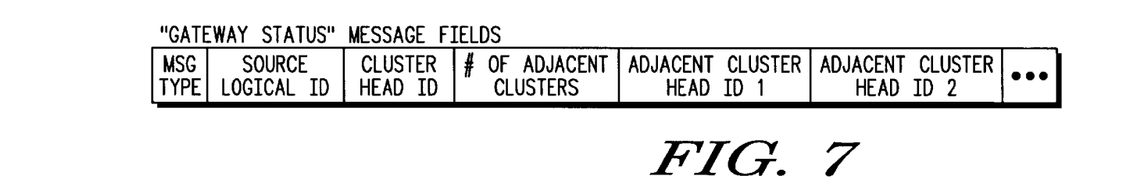
FIG. 7 is a frame diagram of the "gateway status" message fields.

After the wireless network 14 is setup, the border nodes between clusters can identify themselves by comparing logical IDs of neighbor nodes, and neighbor nodes having logical IDs from different cluster heads will accordingly be from a different cluster. These nodes will be identified as "gateway nodes." Each gateway node will pick one "foreign node" from each neighboring cluster that are used to forward messages to the neighboring cluster heads. The gateway nodes can likewise inform their own cluster head of their gateway status and the cluster head ID of neighboring clusters by sending a "Gateway Status" message, as shown in FIG. 7. After getting the Gateway Status message from the gateway node, the cluster head 30 will use the information to create a "Cluster Table". The Cluster Table contains the cluster head ID of the other cluster, and the location of the other cluster heads and those cluster head's corresponding "Coverage Maps."

Figure 8:
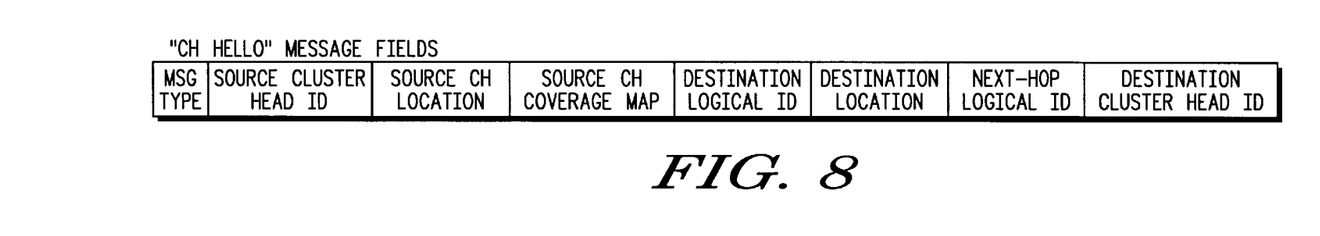
FIG. 8 is a frame diagram of the cluster head hello ("CH Hello") message fields.

Only the cluster head ID is available from the neighboring clusters at this time, and each cluster head 30 will request that a gateway node transmit a "CH Hello" message to the neighboring cluster heads, the CH Hello message shown in FIG. 8. The gateway node's Logical ID and location will be placed in the "Dest. Logical ID" and "Dest. Location" field of the CH Hello message. This packet is routed with a location-based method to the gateway node first. When the gateway node receives the CH Hello message, the gateway node will replace the "Dest. Logical ID" field with the "Dest. CH ID", set the "Next-hop Logical ID" to be the chosen "foreign node," set the "Dest. Location" field blank, and then send the packet to the foreign node. When the foreign node receives the modified CH Hello message, the foreign node will forward the CH Hello message to its parent, and the parent will forward it to its parent, if present, according to the tree structure as shown in FIG. 5.

The modified CH Hello message will eventually reach the neighboring cluster head 30, and after the neighboring cluster head receives the message, the neighboring CH updates its "Cluster Table." If any information is changed in the Cluster Table, the neighboring cluster head 30 will send back another "CH Hello" message containing its own ID, Location, and Coverage Map. This time, the "Dest. Logical ID" and "Dest. Location" can simply be the intended cluster head's ID and Location. The "Dest. CH ID" field is not needed and can be left blank and the packet can be sent using entirely a location-based method. If the "Cluster Table" did not change, no "CH Hello" message needs to be sent back. After setup, all cluster heads will have full information regarding neighboring cluster heads. In order to get information about cluster heads that are not neighboring, each cluster head 30 will exchange their Cluster Table with neighboring cluster heads periodically. In such manner, eventually all cluster heads will learn about all other cluster heads in the network. Table 1 shows an example of a Cluster Table for Cluster (CH ID=123) of the network in FIG. 6.

TABLE 1

| Other CH ID | CH Location | Coverage Map |
|---|---|---|
| 456 | (80,40) | (60,100,0,70) |
| 789 | (60,80) | (0,97,60,100) |
| 876 | (90,105) | (87,97,96,107) |
| ... | ... | ... |

Once created, the Cluster Tables can be used as a distributed database for the queries of nodes in the wireless network 14. Other procedures can be used to provide location information to the nodes without multi-hop communications and relative location calculations, such as direct wireless transmission to the cluster head 30 (no multi-hops necessary), GPS, or manual entry of location. However, the above procedure has an advantage in that it has low device overhead requirements (other than cluster heads), low transmission power requirement for individual devices, and minimum human intervention.

After all the nodes have identified their respective locations, their own cluster head ID, their logical IDs, and their Coverage Maps, each node can set up their own "Routing Zone." An individual node's "Routing Zone" consists of an area with the node in the center, and all the nodes that are within "x" number of hops from the node. The number "x" is determined based on the accuracy of the "Location-Finding Algorithm" used and the transmission range of the nodes. The number of hops should be set so that the area of the "Routing Zone" is greater than the error produced by the Location Finding Algorithm, or as below:

(Tx Range* "x")<Average Location Error by Location Finding Algorithm

For example, in the network of FIG. 6, if the transmission range of the nodes are 15 m, and the average error produced by the Location Finding Algorithm is between 15 m and 30 m, then the "x" should be set to 2.

Each node thus builds a "Zone Routing Table" containing all the nodes that are "x" number of hops from it. For the node (CHID=123, NID=9) in FIG. 6, its corresponding "Zone Routing Table" is shown in Table 2 below. The first section of Table 2 lists the 1-hop neighbors for this node, and the second section lists the 2-hop neighbors.

TABLE 2

| Node Logical ID | Position | Next-hop Node | Time Stamp |
|---|---|---|---|
| 123,9 (Self) | (47.97,56.08) | 123,9 | 234 |
| 123,15 (Parent) | (44.86,52.43) | 123,15 | 789 |
| 123,5 | (47.96,49.60) | 123,5 | 123 |
| 123,11 | ... | 123,11 | ... |
| 123,13 | ... | 123,13 | ... |
| 123,17 | ... | 123,17 | ... |
| 789,13 | ... | 789,13 | ... |
| 789,27 | ... | 789,27 | ... |

TABLE 2-continued

| Node Logical ID | Position | Next-hop Node | Time Stamp |
|---|---|---|---|
| 789,9 | ... | 789,9 | ... |
| 789,39 | ... | 789,39 | ... |
| 123,25 | ... | 123,15 | ... |
| 123,23 | ... | 123,15 | ... |
| 123,3 | ... | 123,17 | ... |
| 789,3 | ... | 789,9 | ... |
| 789,29 | ... | 789,13 | ... |
| 456,5 | ... | 789,27 | ... |
| 456,9 | ... | 789,27 | ... |
| ... | ... | ... | ... |

Figures 9, 10:
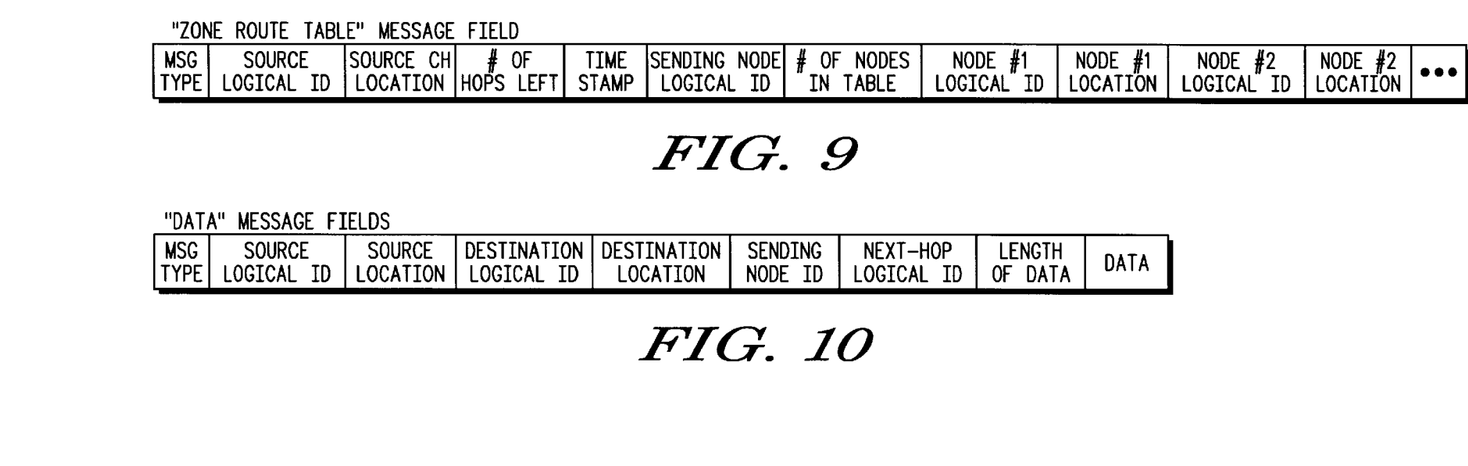
FIG. 9 is a frame diagram of the "zone route table" message fields.
FIG. 10 is a frame diagram of the "data" message fields.

The procedure for building a Zone Routing Table begins with each node's immediate neighbors, and as each node's Zone Routing Table contains only immediate neighbors initially, if (x>1), each node sends its Zone Routing Table to their immediate neighbors, as shown in the Zone Route Table message of FIG. 9. The immediate neighboring nodes then add the sending node's neighbors to their Zone Routing Table if they are not present. The "Next-hop Node" column of the newly added nodes in the Zone Routing Table will be the sending node's ID. After updating the Zone Routing Table, the immediate neighboring nodes subtract 1 from the "Hops Left" field. If this field is greater than 0, the neighbors change the "Sending Node Logical ID" field to its own Logical ID and send this packet to their own immediate neighbors. The neighbors of the first immediate neighbors will update their Zone Routing Table, subtract 1 from "Hops Left" field, and if the number is not 0, forward the packet to their neighbors again. If the "Hops Left" field=0, the packet is no longer forwarded.

To prevent loops, each time a node gets a Zone Routing Table from a neighboring node, it will store the "Source Logical ID," "Time Stamp," and the "Hops Left" in temporary memory. If in the future, it receives a Zone Route Table message with the same "Source Logical ID" and "Time Stamp," it will check to see if "Hops Left" is more than what is stored in temporary memory. If it is, then the Zone Routing Table will be updated and the message will be forwarded as before. Otherwise, the Zone Routing Table will not be updated. One will be subtracted from the "Hops Left" field. The message will simply be forwarded if "Hops Left" is greater than 0. All nodes will have a Zone Routing Table once this procedure has fully iterated.

At this point, each node has an entry for all the nodes within its "Routing Zone" range. When a packet needs to be forwarded, a node first checks the destination address. If the destination address is listed in its Zone Routing Table, the node can simply send (or forward) any packet received to the "Next-hop Node" indicated in the table. For example, a "data" message, as shown in FIG. 10, is sent from node (CHID=123, NID=9) to node (CHID=456, NID=5). With reference to the Zone Routing Table of Table 2, the source node (123,9) will first look at the Zone Routing Table and see if the destination node (456,5) is listed. In this case, it is listed and the "Next-hop Node" for this destination is (789,27). The source node then put the ID of this node (789,27) in the "Next-hop Logical ID" field of the "Data" message and forwards the packet to it. Node (789,27) receives this message, checks its own Zone Routing Table, finds out that the Destination node (456,5) is in its range, and forwards the packet to the Destination node. This Route is shown in the coverage map of FIG. 11.

Figure 13:
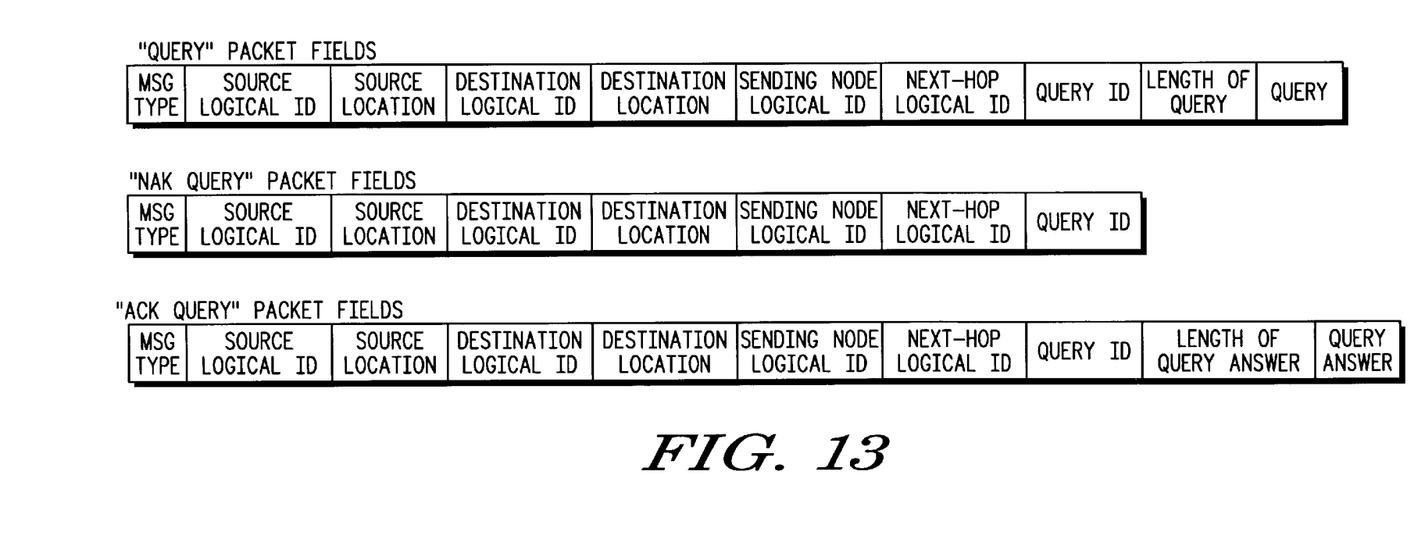
FIG. 13 is a frame diagram for the "query," not acknowledge query ("NAK Query"), and acknowledge query ("ACK Query) packet fields.

For routing to nodes not in the Zone Routing Table, location based routing can be used. For the location-based method to work, the Logical ID and Location of the Destination Node needs to be known. If a node does not have this information, it can send a query to its own cluster head 30. If that node's cluster head 30 cannot find the destination node, the cluster head 30 can forward this query to other clusters listed in its "Cluster Table" through the query packets of FIG. 13.

Figure 11:
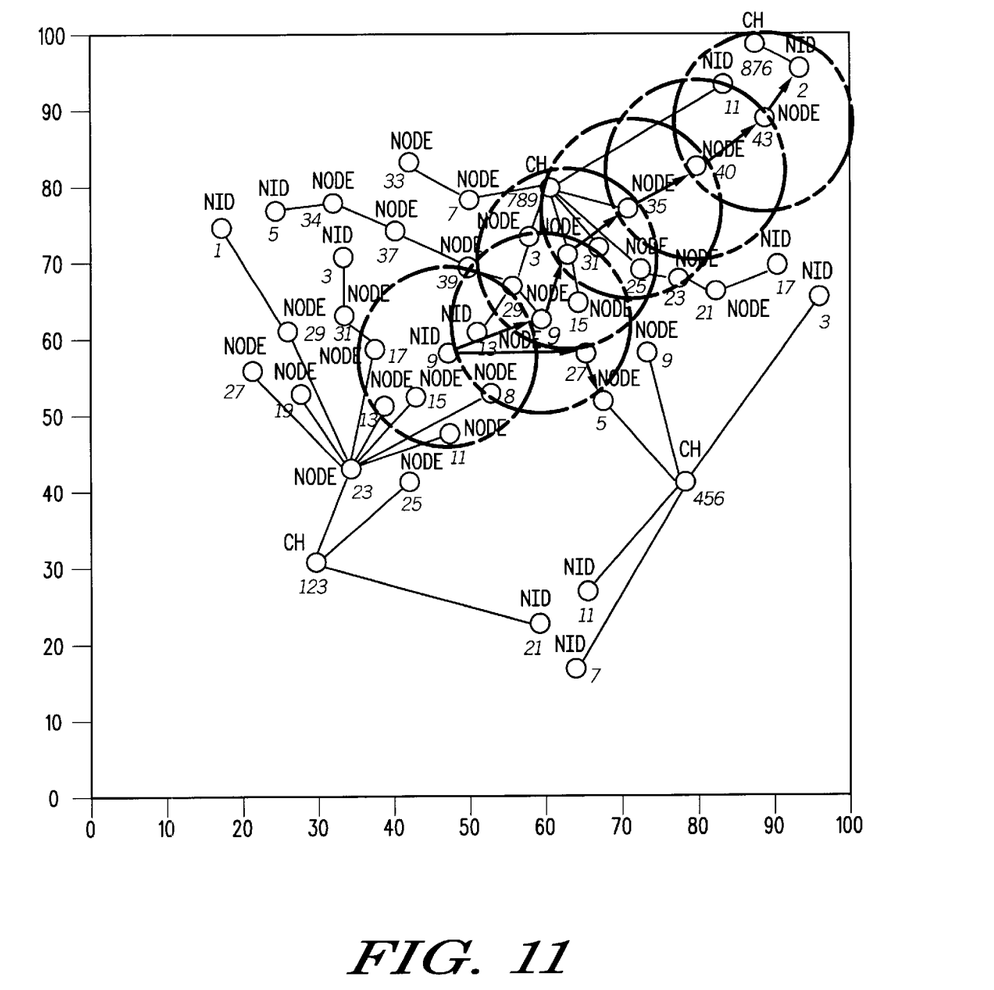
FIG. 11 is a coverage map of the network wherein a packet is sent from one node to another across the network.

For example, in FIG. 11, if a source Node (CHID=123, NID=9) wants to send a packet to a node having a specific functionality, but does not have data as to which node has that capability and where that node is, the source node (123,9) first sends a "Query" packet (FIG. 13) to its own cluster head (CHID=123). If CH(123) does not have the data either, CH(123) first sends this Query packet to its neighboring cluster heads (CH(456) ,CH(789)). If the two cluster heads do not have the data either, the cluster heads will send a "NAK Query" (FIG. 13) back to CH(123). CH(123) then sends the Query to other cluster heads in its Cluster Table (CH(867)). If CH(876) has the data for this Query indicating that Node (876,2) has the requested functionality, CH(876) then sends a message "ACK Query" (FIG. 13) to CH(123). CH (123) then forwards this message to the source Node (123,9). Now Node (123,9) has all the information it needs to send a message to Node (876,2).

After a node has obtained the Logical ID and Location of the destination node, it can assemble "Data" messages (FIG. 10) to the destination node. When the message is to be sent, the source node searches its "Zone Routing Table" and see if the destination node is there. If the destination node is, it will send the packet to the "Next-hop Node" indicated in the Zone Routing Table. Otherwise, the source node compares the destination node's location with its immediate neighbors' location, finds the neighbor node closest to the destination node, puts that neighbor's Logical ID in the "Next-hop Logical ID" field of the "Data" packet, and sends the packet to that neighbor node. After getting this packet, the neighbor node checks to see if the destination node is listed in that node's Zone Routing Table. If so, the packet is sent to the "Next-hop Node" listed in the Zone Routing Table. And if not, the node compares the location of the destination node with nodes in the table, finds the node having the shortest distance to the destination, and forwards the packet to that node. This forwarding process will continue until the packet reaches the destination.

In the above example in FIG. 11, suppose the Source Node (123,9) needs to send a message to Destination Node (876,2). The source checks its Zone Routing Table, finds Node(789,9) to be the closest and transmits the packet to that node. Node(789,9) in turn finds Node(789,31) to be closest and forwards the message there. Node(789,31) then sends it to Node(789,35), which then relays the packet to Node(789,40). Node(789,40) finds the Destination Node (876,2) in its "Zone Routing Table" and sends it to the corresponding "Next-hop Node" Node(789,43). Node(789, 43) finds the Destination Node(876,2) as its neighbor and forwards the message to it. The packet route is shown with arrows in FIG. 11.

Figure 12A:
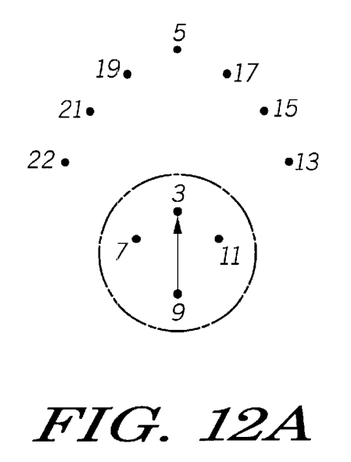
FIG. 12A is a diagram illustrating a "stuck" packet in Node 3 where the packet is intended to be sent from source Node 9 to destination Node 5.
Figure 12B:
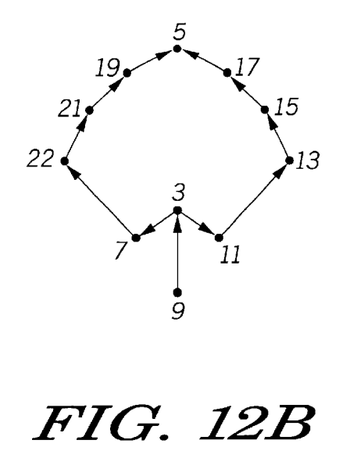
FIG. 12B illustrates Node 3 transmitting "path discovery" messages to other nodes in an attempt to locate a path to the destination node.
Figure 12C:
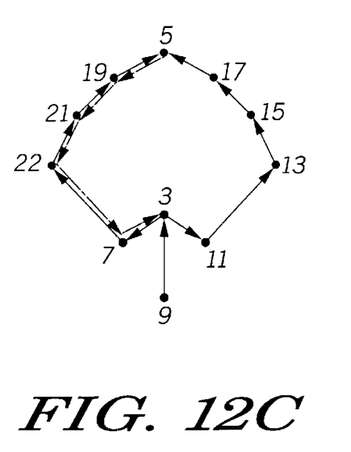
FIG. 12C illustrates a path update message being sent from the destination node back to the original source node along a return path.

It is possible in the wireless network to have a packet arrive at a node and the destination is not listed in its Zone Routing Table, and none of its neighbors are closer to the destination than itself. In such case, the packet is "stuck" in the node. This situation can be resolved by doing a path discovery around the "hole" and add an entry in the Zone Routing Table for the destination node, which shown in FIGS. 12A–12D. Thus, in the system 10, upon a packet reaching a first Node 3 from source Node 9 in the plurality of nodes and the packet is unable to locate a path to the destination Node 5, as shown in FIG. 12A, the Node 3 transmits several "path discovery" packets to several neighbors who are closest to the destination Node 5, as shown in FIG. 12B. The destination node 5 then transmits a "path update" packet back to the first node to thereby provide the first node with the optimal path for the packet, as shown in FIG. 12C. More particularly, the node that the packet is "stuck" in sends several "Path Discovery" messages, shown in FIG. 13, to a limited number of neighbors who are closest to the destination. The "stuck" node will add an entry in its "Zone Routing Table" with the destination node's Logical ID and position. It will leave the "Next-hop Node" and the "Time Stamp" entries empty for now. For example, Table 3 illustrates an updated Zone Routing Table with the lower entries added from path discovery.

TABLE 3

| Node Logical ID | Position | Next-hop Node | Time Stamp |
| --- | --- | --- | --- |
| 3 | (30,20) | 3 | 123 |
| 11 | (40,10) | 11 | 345 |
| 7 | (20,10) | 7 | 221 |
| 9 | (30,5) | 9 | 234 |
| ... | ... | ... | ... |
| 5 | (30,42) | 7 | 789 |

The neighbors, after receiving the "Path Discovery" message, will check to see if it has received this Path Discovery packet before. If it has not, the neighbor will add the "Source Logical ID", "Dest. Logical ID", and the "Packet ID" to its temporary memory, and add its own ID to the "Sending Node ID" field at the end of the packet, add one to the "# of Past Nodes" field. If the destination node is in it's the neighbor's Zone Routing Table, the "Path Discovery" packet will be sent to the corresponding "Next-hop" node in the table. Otherwise, it will find an immediate neighbor whose distance is closest to the destination node and forwards the Path Discovery packet to that immediate neighbor. If the Path Discovery packet receiving node determines that it is the closest node to the destination node among its neighbors (in other words, the packet is "stuck" in this neighbor node as well), it will add an entry in its Zone Routing Table for the destination node (its ID, position, and the current time for the time stamp column for now), then forwards the Path Discovery packet to a few other neighbor nodes who are closest to the destination node. This process continues until the "Path Discovery" packet reaches the destination node.

Figure 12D:
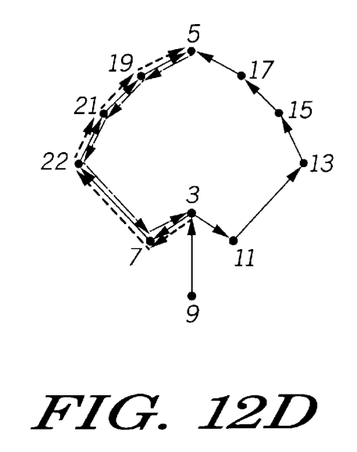
FIG. 12D illustrates the original message being sent from Node 9 to Node 5 along the newly discovered path.
Figure 14:
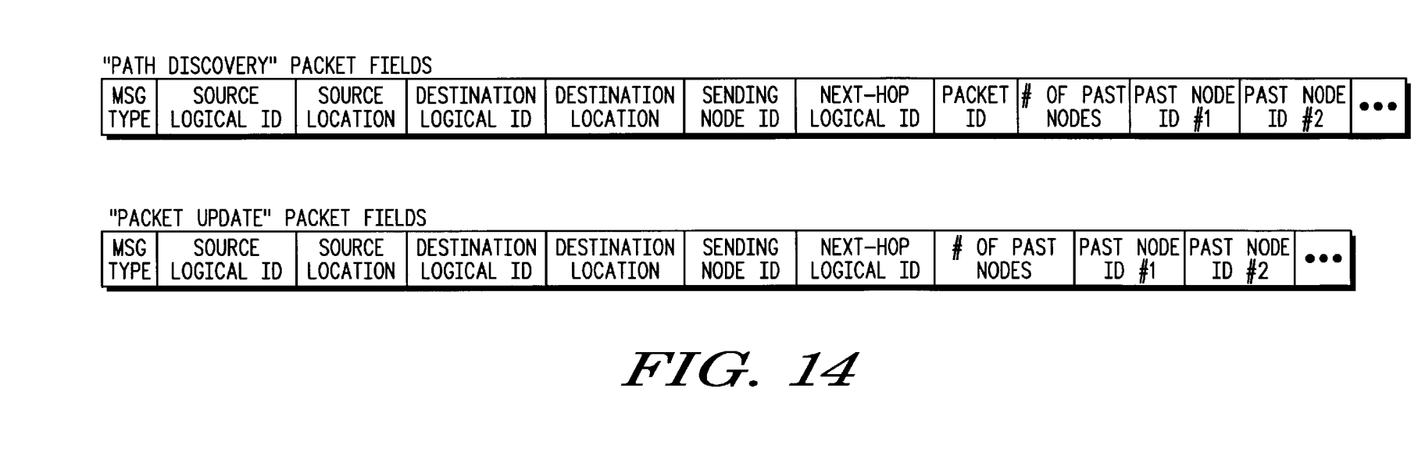
FIG. 14 is a frame diagram of the "path discovery" and "path update" packet fields.

When the "Path Discovery" packets reach the destination node, the destination node will pick the most optimum path (i.e., shortest # of hops, shortest time, or some other metric), and send a "Path Update" message back to the Source Node through the picked path. A Path Update packet is shown in FIG. 14, and the packet retraces the route back to the Source node. For every node in the return route, if an entry for the destination exists in the node's Zone Routing Table, then the node updates the "Next-hop Node" with the "Sending Node ID," and updates the "Time Stamp" column. If an entry does not exist in the Zone Routing Table, then the node does not update its table. In either event, the node inserts its own Logical ID in the "Sending Node ID" field, moves the last "Past Node ID" into the "Next-hop Logical ID" field and send the packet to the next node in the return route. When the "Path Update" packet reaches the Source Node (the node that started the "Path Discovery"), a route would be setup to route packets out of the hole in the wireless network 14 in the future, as shown in the new path of FIG. 12D. Thus, upon a packet attempting to pass through the previous "stuck" node, that node can find the destination node in its Zone Routing Table entry and forwards the packet to the "Next-hop Node" shown in the table entry.

As more messages are sent from different Source-Destination node pairs, more and more "holes" in the network will be discovered and path discoveries will be performed to recover from these "holes." Eventually, all of the "holes" in the network will be discovered and recovered. At this time, path discovery procedures will no longer need to be started again to recover "holes." Plus, no more additional entries are needed in the Zone Routing Tables. In this case, the Voronoi view of the network is said to be complete.

If the location of nodes is a Poisson process, then the average number of route discovery initiated by each node is on the order of O(log n), where n is the number of nodes in the network. The mean routing table size is bounded by O(m log n), where m is the mean shortest path between any pair of nodes in a random network of n nodes. In the above protocol, slight improvements in the "Path Discovery" and "Path Update" algorithms are made. Therefore, the upper bound of the mean routing table size should be less than O(m log n). However, when a multi-hop is introduced in the "Routing Zone" to combat against errors in the Location Finding Algorithm, this increases the mean routing table size to about "x" times, where "x" is the number of hops in the "Routing Zone."

Occasionally, the location information on a destination node is wrong due to mobility of a node, or mistake in determining a node's location. If the mistake of the location is less than the "Routing Zone" range, it will have no effect on the normal location routing algorithm as the destination node will be listed in the "Zone Routing Table" and the "Next-hop Node" to forward the packet will be known. Thus, the packets will be sent to the "Next-hop Node" and reach the destination without problems. However, if a node determines that the location of the destination node should be within its "Routing Zone" range, but there is no entry for the destination node in the Zone Routing Table, then there is a mistake on the location of the destination node that needs correction.

In the system 10, upon a first node receiving a packet from a source node that transmitted the packet to the first node, and based on the location of the destination node, the destination node should be within the "Routing Zone" range of the first node and in the first node's Zone Routing Table, but it is not. The first node therefore knows that the location of the destination node must be wrong. The first node then transmits a "Wrong Location" packet to the source node. In other words, the node that determines the mistake sends a "Wrong Location" packet, shown in FIG. 15, back to the source node, and to the cluster head 30 of the destination node. The cluster head of the destination node will check to see if an updated position for the missing node is available. If so, that cluster head will send this updated location to the "Original Source Node." Otherwise, the cluster head will delete the destination node's location information from its database, and it will send a message informing that the node is missing to all future queries regarding the destination node. The node that discovers the location mistake can locate a missing node by doing a "local flood" of "Location Discovery" packets, a "Location Discovery" Packet shown in FIG. 14. In the "Location Discovery" packet, the "Source Node ID" and "Source Location" represent the Original Source Node that attempted to send a message to the missing node earlier. The "Dest. Logical ID" is the ID of the missing node, and "# of hops allowed to forward" controls the extent of the flooding of the nodes of the wireless network 14. The neighboring nodes that receive the "Location Discovery" packet will first check to see if the Dest. Logical ID is listed in its Zone Routing Table.

Figures 15, 16:
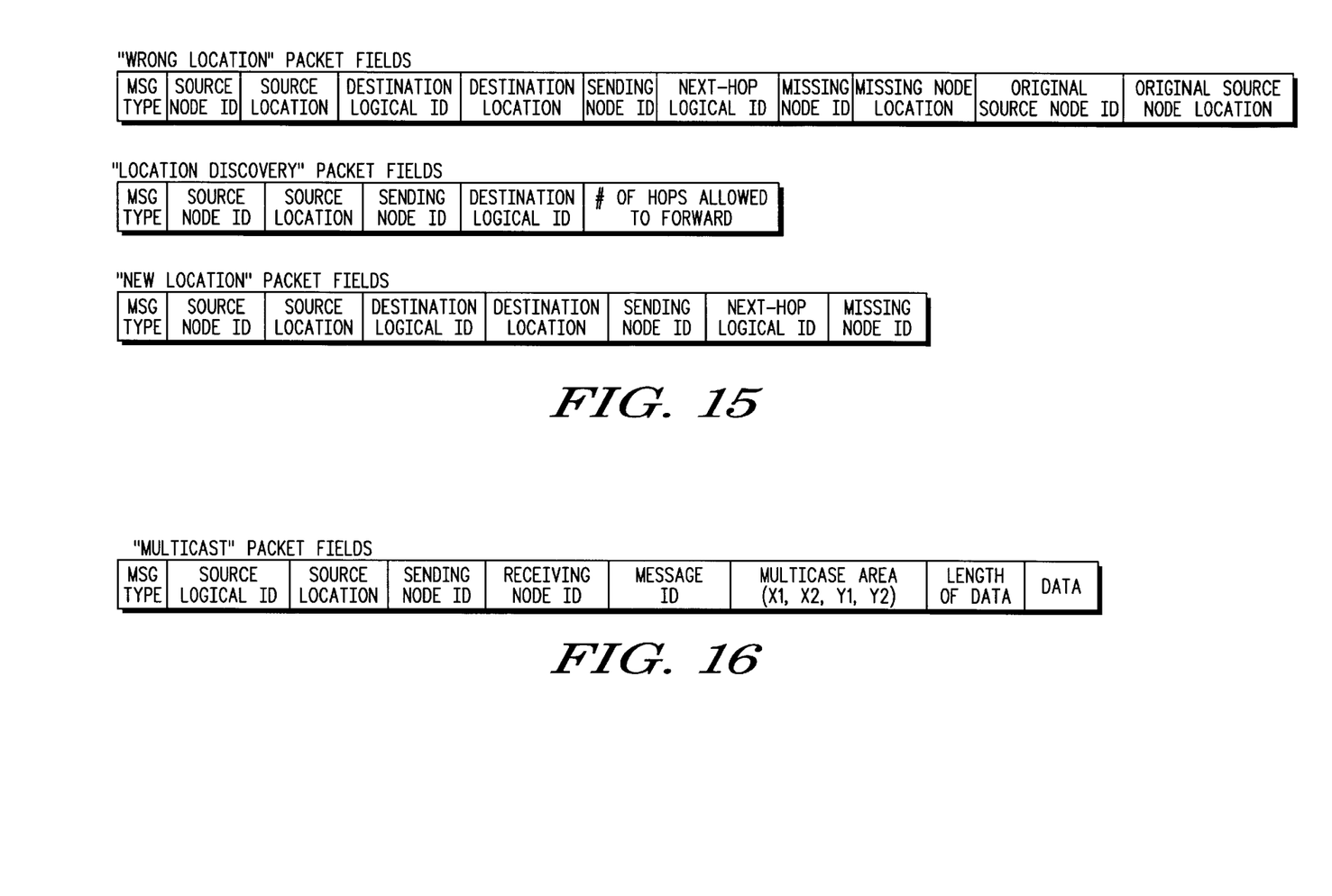
FIG. 15 is a frame diagram of the "wrong location," "location discovery" and "new location" packet fields.
FIG. 16 is frame diagram of the "multicast" packet fields, wherein a multicast packet is intended for distribution to all nodes within a specific geographical area in the network.

If so, the node discovering the location sends three "New Location" packets, a "New Location" packet shown in FIG. 15. One "New Location" packet is sent to the original source node, one to the missing node, and one to the missing node's cluster head. The original source node and the missing node's cluster head will put the location of the node that discovered the missing node as the missing node's location for the moment. The missing node will recalculate its location by measuring its relative distances from neighbors and sending them to its cluster head 30 for processing. When the cluster head 30 recalculates the new location for the missing node, it will send this information to the missing node and to the original source node. The missing node will send this new location information to the members of its Zone Routing Table so that the other nodes can update their entries in their Zone Routing Tables with the new information.

Conversely, if the neighbor node does not have the missing node in its Zone Routing Table, then the neighbor node will subtract 1 from the "# of hops allowed to forward" in the "Location Discovery" message. If the result is greater than 0, then the neighbor node puts its Logical ID in the "Sending Node ID" field and forwards this packet to all of its neighbors.

The product of "# of hops allowed" and the transmission range of nodes should be set to cover a percentage of the "Average Location Error" on network nodes. This "Average Location Error" can depend the mobility of nodes, the rate of node additions or deletions of nodes in the network, and the errors caused by the location finding algorithm. The higher the "Average Location Error" is, the more hops should be allowed for local flooding and the "# of hops allowed" in the "Location Discovery" packet should accordingly be set higher.

At the end of the setup stage, all cluster heads can locate other cluster heads in the wireless network 14, along with the cluster head's respective Coverage Maps. Furthermore, every node has a geographical Coverage Map of its dependents, so all nodes of the network are contactable. Therefore, geographical multicasting of packets along the tree structure is very straightforward. In particular, when a source node needs to send a message to a group of nodes in a particular geographical area, the source node first assembles a "Multicast" packet, which is shown in FIG. 16. The multicast packet needs to specify four points of a rectangle representing the geographical area of the multicast region. The source node will compare its own Coverage Map with the area of the multicast region and if the Coverage Map overlaps with the multicast region, the multicast packet will be sent to all child nodes. However, if the Coverage Map does not overlap with the multicast region, or only overlaps with it partially, the source node sends the packet up to its parent node. Note that if a node's Coverage Map overlaps with the multicast region partially, it will not only send the packet down to its child nodes, but also sent the packet up to its parent. Whether the multicast packet is sent up to a parent, or down to the children, the receiving nodes will again compare their own Coverage Map with the multicast region and forward the packet the same manner. This continues until the multicast packet reaches all of the nodes under the specified multicast region. If a Cluster Head has its Coverage Map overlaps with the multicast region partially, in addition to sending the multicast packet to its children, the Cluster Head will also sent the packet to other Cluster Heads who have their Coverage Maps overlap with the multicast region as well.

The implementation of the inventive protocol is easily implemented in wireless devices as the only memory requirement for routing is a Zone Routing Table in each node. Moreover, the length of the Zone Routing Table tables does not increase as the number of nodes in the network increases, as long as the node density stays constant. This characteristic makes the above network structure and routing scheme very scalable. In addition, since each node is only required to know that node's own location and the destination node's location for routing and sending packets, no update packets need to be sent for link changes outside of a node's "Routing Zone." This in turn makes the protocol very energy efficient, and at the same time, very robust against topology changes.

While there has been shown a preferred embodiment of the present invention, it is to be understood that certain changes may be made in the form and arrangement of the elements, or in the steps of the method, without departing from the underlying spirit and scope of the invention set forth in the claims.

What is claimed is:

1. A system for establishing a network within a plurality of interconnected and randomly geographically located nodes, comprises:
   one or more cluster heads of the plurality of nodes wherein each cluster head is coupled to a corresponding one or more dependent nodes of the plurality of nodes and thereby forms a cluster, wherein each cluster head is operable to communicate with other cluster heads of the one or more cluster heads and said cluster heads one or more dependent nodes;
   each cluster head uses a first location function to determine its geographical location;
   each node of the plurality of nodes uses a second location function to determine relative distances to a plurality of neighboring nodes;
   each cluster head of the one or more cluster heads selectively receives and stores location information received from the other cluster heads and said cluster heads' one or more dependent nodes; and
   each cluster head of the one or more cluster heads selectively communicates its location information to its one or more dependent nodes thereby allowing each node of the plurality of nodes to also determine its location with respect to a corresponding cluster head of the one or more cluster heads.

2. The system of claim 1, wherein the plurality of nodes are each a wireless device, and at least one cluster head of the one or more cluster heads is a dedicated device.

3. The system of claim 1, wherein each cluster head of the one or more cluster heads stores a database of a location of the nodes within its own cluster.

4. The system of claim 1, wherein the plurality of nodes are interconnected through packet exchange, and each packet is transmitted from a source node of the plurality of nodes, through one or more nodes of the plurality of nodes of the network, and received at a destination node of the plurality of nodes.

5. The system of claim 4, wherein, upon a packet reaching a first node in the plurality of nodes and the first node is unable to locate a path to the destination node, the first node transmits a path discovery packet to the destination node, and the destination node transmits a path update packet back to the first node, thereby providing the first node, along with one or more nodes along the return path that are unable to locate a path to the destination node, with an optimal path for the packet.

6. The system of claim 4, wherein a first node of the plurality of nodes receives a packet from a source node that transmitted the packet to the first node, and the first node notices that the location of the destination node is wrong, the first node transmits a wrong location packet to one or more of the source node and the cluster head of the destination node.

7. The system of claim 4, wherein a multicast packet is selectively sent to the one or more nodes within a geographical region using Coverage Maps of the one or more nodes, wherein the one or more nodes have a tree structure.

8. The system of claim 4, wherein, after the one or more cluster heads have created the network within the plurality of nodes, each node has a resident zone routing table stored thereupon wherein the zone routing table identifies the next node to relay a packet based upon the destination node of the packet.

9. The system of claim 1, wherein the second location function is one or more of triangulation, manual input, global positioning system (GPS) location, received signal strength (RSS), timing from direct sequence spread spectrum (DSSS) signals, ultra wide band signals, and use of a nodes random ID.

10. The system of claim 1, wherein the one or more cluster heads are determined by executing an algorithm designed to rank the cluster heads according to one or more performance measures.

11. The system of claim 10, wherein the one or more performance measures include one or more of processing power, processing speed, latency, bandwidth, utilization, reliability, and cost.

12. The system of claim 1, wherein the first location function is one or more of triangulation, manual input, global positioning system (GPS), and received signal strength (RSS).

13. The system of claim 12, wherein for each cluster head at least two other nodes of the plurality of nodes in data transmission range of said cluster head use a third location function to determine their locations independently and provide this information to the cluster head.

14. The system of claim 1, wherein after the network is created, facilitating the transmission of a packet from a source node of the plurality of nodes to a destination node of the plurality of nodes comprises:
   an intermediate node of the plurality of nodes checks if the destination address is in a zone routing table of the intermediate node;
   the intermediate node forwards the packet if the destination address is in the zone routing table of the intermediate node;
   if the destination address is not in the zone routing table of the intermediate node, the intermediate node requests a path to the destination node from a cluster head of the intermediate node using a logical ID of the destination node;
   if the cluster head of the intermediate node has the path to the destination node based upon the logical ID, then the packet is so forwarded; and
   if the cluster head of the intermediate node does not have the path to the destination node, the cluster head of the intermediate node queries other cluster heads listed in a cluster table of the cluster head of the intermediate node.

15. The system of claim 14, further comprising:
   if no cluster heads in the cluster table of the cluster head of the intermediate node have a path to the destination, the intermediate node transmits a path discovery packet to a plurality of neighbors closest to the logical ID of the destination node;

if the destination node responds with a path update providing an optimal path for the packet, then the packet is forwarded to the destination using this optimal path; and if the destination node does not respond, then the packet is not transmitted to the destination node and an error packet is sent to the source node.

16. The system of claim 1, wherein each node of the plurality of nodes has a logical ID, and said logical ID specifies its nodes location relative to other nodes in the network.

17. The system of claim 16, wherein the logical ID comprises a cluster ID and a node ID.

18. The system of claim 16, wherein a node of the plurality of nodes that forwards a logical ID to a neighbor updates the nodes coverage map, said coverage map defined to be a union of all coverage areas of said nodes dependent nodes.

19. The system of claim 1, wherein the plurality of nodes are organized into a plurality of layers said layers being logically organized so that a node of a first layer is operable to store its location with respect to a common reference and said node of the first layer is further operable to send network invitation messages to nodes of a second layer, thereby allowing nodes of the second layer to be added to the network.

20. The system of claim 19, wherein first layer comprises those nodes that are neighbors of a cluster head, and wherein subsequent layers comprise those nodes that are one hop distance from a previous layer.

21. The system of claim 19, wherein upon nodes of the second layer being invited to join the network, these nodes provide their relative distance information to the first layer, first layer then relaying this relative distance information to the cluster heads, wherein the cluster heads then use this relative distance information to calculate location of nodes of the second layer and assign location ID's to the nodes of the second layer.

22. The system of claim 21, wherein a node of the second layer selects a node of the first layer to act as a parent node, wherein the parent node is operable to relay network information between the network and the node of the second layer.

23. The system of claim 22, wherein the parent node is selected using one or more of the following metrics: least depth to a cluster head, parent node signal strength, and a load parameter.

24. The system of claim 19, wherein a node of the first layer updates its coverage map whenever a cluster head calculates a location of a node of the second layer.

25. The system of claim 1, wherein one or more of the plurality of nodes are designated as gateway nodes, said gateway nodes having neighbors from more than one cluster.

26. The system of claim 25, wherein the gateway nodes communicate their gateway status to their respective cluster heads, thereby allowing each cluster head in the network to communicate via the gateway nodes with other cluster heads and build a cluster table containing ID's of other cluster heads within the network.

27. The system of claim 26, wherein each cluster head obtains the contents of cluster tables of non-neighboring cluster heads by a periodic exchange of cluster table information with neighboring cluster heads and a comparison of exchanged cluster table information with stored cluster table information.

28. The system of claim 27, wherein the cluster tables reduce the protocol overhead by acting as distributed databases of node location information.

29. The system of claim 1, wherein after the network has been established each node of the plurality of nodes possesses a routing zone table that indicates a number of hops to other nodes within the network.

30. The system of claim 29, wherein a transmission range of the node and a hop distance X to a given node within the routing zone satisfy the following equation:

$$(\text{Transmission Range} * X) < \text{Average Location Error}$$

wherein average location error is defined as an average location error of the second location function.

31. The system of claim 1, wherein each cluster head of the one or more cluster heads selectively communicating its location information to its one or more dependent nodes further comprises the one or more dependent nodes determining their location in the network relative to said cluster head.

32. A method for establishing a network within a plurality of interconnected and randomly geographically located nodes, comprising:

designating one or more cluster heads within the plurality of nodes, each cluster head selectively communicating with other cluster heads and nodes of the plurality of nodes;

determining the geographical location of each cluster head using a first location function;

determining relative distances from a node of the plurality of nodes to each neighbor of that node using a second location function;

determining nodes dependent from each cluster head within the plurality of nodes;

selectively receiving and storing at each cluster head the location information of other cluster heads and the dependent nodes of that cluster head; and each cluster head of the one or more cluster heads selectively communicating its location information to its one or more dependent nodes thereby allowing each node of the plurality of nodes to also determine its location with respect to a cluster head of the one or more cluster heads.

33. The method of claim 32, wherein each cluster head of the one or more cluster heads stores a database of the location of its nodes and other cluster heads.

34. The method of claim 32, wherein the plurality of nodes are interconnected through packet exchange, and further comprising:

selectively transmitting one or more packets from a source node of the plurality of nodes, through one or more of the plurality of nodes of the network; and receiving each transmitted packet at a destination node of the plurality of nodes.

35. The method of claim 34, further comprising:

upon a packet reaching a first node in the plurality of nodes and the first node is unable to locate a path to the destination node, transmitting from the first node a path discovery packet to the destination node; and transmitting from the destination node along a return path a path update packet back to the first node, and one or more nodes in the return path that is unable to locate a path to the destination node, thereby providing the first node and the one or more nodes with an optimal path for the packet.

36. The method of claim 34, further comprising:
selectively sending a multicast packet to one or more nodes within a geographical region using Coverage Maps of the one or more nodes, wherein the one or more nodes have a logical tree structure.

37. The method of claim 34, further comprising storing a resident zone routing table upon each node of the plurality of nodes wherein the zone routing table identifies the next optimal node to relay a packet based upon the destination node of the packet.

38. The method of claim 37, further comprising, upon a first node of the plurality of nodes receiving a packet from the source node that transmitted the packet to the first node, and wherein the first node should have the location of the destination node within its Routing Zone Table but the node is not listed in its Zone Routing Table, the first node transmits a wrong location packet to the source node and to the source node's Cluster Head, and the first node attempting to find the missing node with a local packet flooding process.

39. The method of claim 37, wherein nodes of the one or more nodes that are neighbors exchange zone routing table information.

40. The method of claim 32, wherein creating the network within the plurality of nodes based upon the stored location information within the one or more cluster heads further comprises:
identifying one or more gateway nodes, wherein each gateway node has neighbor nodes belonging to more than one cluster head;
each cluster head communicating with other cluster heads using a gateway node of the one or more gateway nodes so that a cluster table containing ID's, locations and coverage maps of other cluster heads is created; and
each cluster head using the cluster table as a distributed database of node location and routing information of the network.

41. The method of claim 32, wherein each cluster head obtains the contents of cluster tables of non-neighboring cluster heads by a periodic exchange of cluster table information with neighboring cluster heads and a comparison of exchanged cluster table information with stored cluster table information.

42. The method of claim 32, wherein after the network is created, a node receiving a packet to be forwarded, and forwarding this packet using one of:
one or more nodes within a transmission range of said node;
location based routing, wherein the node determines a destination logical ID and destination location for the packet and forwards the packet to a node closest to the destination location;
path discovery routing, wherein said node transmits a plurality of path discovery messages to a plurality of nodes that are close to a destination location of said packet, and the plurality of nodes attempt to communicate with destination location to provide said node with a path to the destination location of the packet; and
location discovery routing, wherein said node determines that destination location of the packet is incorrect and communicates with its neighbors to potentially locate the missing node.

43. The method of claim 32, wherein the first location function is one or more of triangulation, manual input, global positioning system (GPS), and received signal strength (RSS).

44. The method of claim 32, wherein the second location function is one or more of triangulation, manual input, global positioning system (GPS) location, received signal strength (RSS), timing from direct sequence spread spectrum (DSSS) signals, ultra wide band signals, and use of a nodes random ID.

45. The method of claim 32, wherein the plurality of nodes are each a wireless device, and at least one cluster head is a dedicated device.

46. The method of claim 32, wherein for each cluster head at least two other nodes in data transmission range of said cluster head also determine their location independently using a third location function and provide this information to the cluster head.

47. The method of claim 32, wherein the process of assigning one or more cluster heads further comprises:
executing an algorithm designed to rank the cluster heads according to one or more performance measures.

48. The method of claim 47, wherein the one or more performance measures include one or more of processing power, processing speed, latency, bandwidth, utilization, reliability, and cost.

49. The method of claim 32, wherein selectively receiving and storing at each cluster head the location information of other cluster heads and dependent nodes of that cluster head further comprises:
each cluster head informing neighboring nodes of its presence;
the neighboring nodes responding with their relative location information;
each cluster head updating its database with the position of its neighboring nodes based upon the relative location information received from its neighboring nodes;
each cluster head assigning logical IDs to its neighboring nodes; and
each node with a logical ID continuing this process of inviting its neighbors to join the network, forwarding relative location information to the cluster head, sending logical ID's assigned by the cluster head to neighboring nodes, until all nodes are in the network and each cluster head contains relative location information of nodes within its cluster.

50. The method of claim 49, wherein a logical ID is formed from a MAC address of a device of each cluster head.

51. The method of claim 49, wherein a logical ID comprises a cluster ID and a node ID.

52. The method of claim 49, wherein each node also maintains a zone routing table comprising the number of hops to nodes within its cluster.

53. The method of claim 49 wherein each node that forwards a logical ID to a neighbor updates a coverage map of that node.

54. The method of claim 53, wherein the coverage map is defined to be a union of all dependent nodes coverage areas.

55. The method of claim 32, wherein after the network is created, facilitating the transmission of a packet from a source node to a destination node comprises:
an intermediate node checking if the destination address is in a zone routing table of the intermediate node;
delivering the packet if the destination address is in the zone routing table of the intermediate node;
requesting the path to the destination from a cluster head of the intermediate node using the logical ID of the destination node;
if the cluster head of the intermediate node has the path to the destination node based upon the logical ID, then the packet is so forwarded; and
if the cluster head of the intermediate node does not have the path to the destination node, the cluster head of the intermediate node queries other cluster heads listed in a cluster table of the cluster head of the intermediate node.

56. The method of claim further comprising:
if no cluster heads in the cluster table of the cluster head of the intermediate node have a path to the destination, transmitting a path discovery packet to a plurality of neighbors closest to the logical ID of the destination node;
if the destination node responds with a path update providing an optimal path for the packet, then the packet is forwarded to the destination using this optimal path; and
if the destination node does not respond, then the packet is not transmitted to the destination node and an error packet is sent to the source node.

57. The method of claim 32, wherein determining nodes dependent from each cluster head within the plurality of nodes further comprises:
each cluster head determining those neighbor nodes of the plurality of nodes that are within a transmission range of said cluster head;
said cluster head communicating with these neighbor nodes to invite one or more of these neighbor nodes to perform network communications via said cluster head;
a subset of the one or more of the neighbor nodes accepting the invitation of said cluster head and providing their relative location with respect to their neighbors; and
said cluster head sending location information relative to said cluster head and assigning logical IDs to the subset of the one or more of the neighbor nodes.

58. The method of claim 32, wherein each cluster head of the one or more cluster heads selectively communicating its location information to its one or more dependent nodes further comprises the one or more dependent nodes determining their location in the network relative to said cluster head.

59. A method for creating and maintaining a network, wherein
during a network setup phase further comprising:
assigning one or more cluster heads within a plurality of interconnected and randomly geographically located nodes, each cluster head selectively communicating with other cluster heads and nodes;
assigning logical IDs to the one or more cluster heads;
determining the geographical location of each cluster head using a first location determination function;
determining relative distances from a node to each neighbor of that node using a second location determination function, thereby enabling a coverage map for each node to be created;
during a cluster communication phase, further comprising:
identifying one or more gateway nodes, said gateway nodes having neighbors from more than one cluster;
the one or more gateway nodes communicating cluster head IDs of neighboring clusters to the cluster heads;
each cluster head creating a cluster table, said cluster table representing location, cluster ID, and coverage maps of other cluster heads with which said cluster head is able to communicate;
each cluster head updating its cluster table to include cluster heads that are reachable via communication with current entries in the cluster table;
during a node routing creation phase, further comprising each node communicating with its neighboring nodes to identify all nodes that are within transmission range of said node: and during a network maintenance phase, further comprising:
a node receiving a packet to be forwarded, and forwarding this packet using one of:
said nodes list of nodes within the transmission range of said node;
location based routing, wherein the node determines a destination logical ID and destination location for the packet and forwards the packet to a node closest to the destination location;
path discovery routing, wherein said node transmits a plurality of path discovery messages to a plurality of nodes that are close to a destination location of said packet, and the plurality of nodes attempt to communicate with destination location to provide said node with a path to the destination location of the packet; and
location discovery routing, wherein said node determines that destination location of the packet is incorrect and communicates with its neighbors to potentially locate the missing node.

60. The method of claim 59, wherein each cluster head updating its cluster table further comprises communicating a hello message to neighboring cluster heads, said neighboring cluster heads updating their cluster tables, and said neighboring cluster heads replying to said cluster head with their location, ID, and coverage map.

61. The method of claim 59, wherein a source node is operable to send a message to a certain geographical area by sending one or more multicast packets to one or more of said nodes cluster head and said nodes neighbors wherein the one or more multicast packets are routed by comparing the certain geographical area to coverage maps of nodes said one or more multicast packets are routed to.

62. The method of claim 61, wherein the missing node and the cluster head of the missing node update their routing information and inform their neighbors of the updated location of the missing node.

63. The method of claim wherein upon the location discovery locating the missing node, new location packets are sent to the source of the packet, the missing node, and the cluster head of the missing node.

64. A system for establishing a network within a plurality of interconnected and randomly geographically located nodes, comprising:
one or more cluster heads of the plurality of nodes wherein each cluster head is coupled to a corresponding one or more dependent nodes of the plurality of nodes thereby forming a cluster, wherein each cluster head has means to communicate with other cluster heads of the one or more cluster heads and said cluster heads one or more dependent nodes;
means for each cluster head to determine its geographical location using a first location function;
means for each node of the plurality of nodes to determine relative distances to a plurality of neighboring nodes using a second location function;
means for each cluster head of the one or more cluster heads to selectively receive and store location information received from the other cluster heads and said cluster heads one or more dependent nodes; and
means for each cluster head of the one or more cluster heads to selectively communicates its location information to its one or more dependent nodes thereby allowing means for each node of the plurality of nodes to also determine its location with respect to a cluster head of the one or more cluster heads.

* * * * *